US010270980B2

(12) United States Patent
Kawazoe

(10) Patent No.: US 10,270,980 B2
(45) Date of Patent: Apr. 23, 2019

(54) IMAGE CAPTURE CONTROL APPARATUS, IMAGE CAPTURE APPARATUS, AND METHOD OF CONTROLLING IMAGE CAPTURE APPARATUS

(71) Applicant: Sony Semiconductor Solutions Corporation, Kanagawa (JP)

(72) Inventor: Daisuke Kawazoe, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 15 days.

(21) Appl. No.: 15/505,312

(22) PCT Filed: Jul. 9, 2015

(86) PCT No.: PCT/JP2015/069744
§ 371 (c)(1),
(2) Date: Feb. 21, 2017

(87) PCT Pub. No.: WO2016/031403
PCT Pub. Date: Mar. 3, 2016

(65) Prior Publication Data
US 2017/0272637 A1    Sep. 21, 2017

(30) Foreign Application Priority Data

Aug. 29, 2014   (JP) .................. 2014-174735

(51) Int. Cl.
*H04N 5/235* (2006.01)
*H04N 5/232* (2006.01)
(Continued)

(52) U.S. Cl.
CPC ............. *H04N 5/2352* (2013.01); *G02B 7/09* (2013.01); *G02B 7/102* (2013.01);
(Continued)

(58) Field of Classification Search
CPC ........ H04N 5/2352; H04N 5/144; G02B 7/09; G06T 5/003; G06K 9/4604
(Continued)

(56) References Cited

U.S. PATENT DOCUMENTS 9,420,166 B2*  8/2016  Hamalainen ....... H04N 5/23216
                                                348/222.1
2005/0259177 A1  11/2005  Senoo
2014/0334683 A1  11/2014  Masuda

FOREIGN PATENT DOCUMENTS

JP      10-164420 A      6/1998
JP      2005-109705 A    4/2005
(Continued)

*Primary Examiner* — Yogesh K Aggarwal
(74) *Attorney, Agent, or Firm* — Wolf, Greenfield & Sacks, P.C.

(57) ABSTRACT

To improve image quality of image data.
A moving body detection unit detects, as a moving body area, an area of a moving body from an input frame every time the input frame captured by an image capture unit is input. A prediction unit predicts, as a prediction area, an area corresponding to the moving body area in a next input frame following the input frame from the moving body area every time the input frame is input. A statistical information generation unit that generates statistical information by performing predetermined statistical processing on each of pixel values of pixels in either an area excluding the predicted prediction area from a specific processing area in the input frame or an area that overlaps the prediction area in the processing area every time the input frame is input. A control information generation unit that generates predetermined control information for controlling the image capture unit based on the statistical information every time the statistical information is generated. A controller that controls the image capture unit and causes the image capture unit to
(Continued)

capture the next input frame based on the control information every time the control information is generated.

10 Claims, 17 Drawing Sheets

(51) Int. Cl.
    *G02B 7/09*     (2006.01)
    *G06K 9/46*     (2006.01)
    *G06T 5/00*     (2006.01)
    *H04N 5/14*     (2006.01)
    *G02B 7/10*     (2006.01)
    *G06K 9/00*     (2006.01)
    *G06K 9/32*     (2006.01)

(52) U.S. Cl.
    CPC ....... *G06K 9/00771* (2013.01); *G06K 9/3216* (2013.01); *G06K 9/4604* (2013.01); *G06T 5/003* (2013.01); *H04N 5/144* (2013.01); *H04N 5/232* (2013.01); *H04N 5/2351* (2013.01); *H04N 5/23296* (2013.01)

(58) Field of Classification Search
    USPC ...................................................... 348/222.1
    See application file for complete search history.

(56) References Cited

FOREIGN PATENT DOCUMENTS

| | | |
|---|---|---|
| JP | 2005-331590 A | 12/2005 |
| JP | 2006-243373 A | 9/2006 |
| JP | 2008-107565 A | 5/2008 |
| JP | 2008-141239 A | 6/2008 |
| WO | WO 2013/088917 A1 | 6/2013 |

\* cited by examiner

FIG. 11
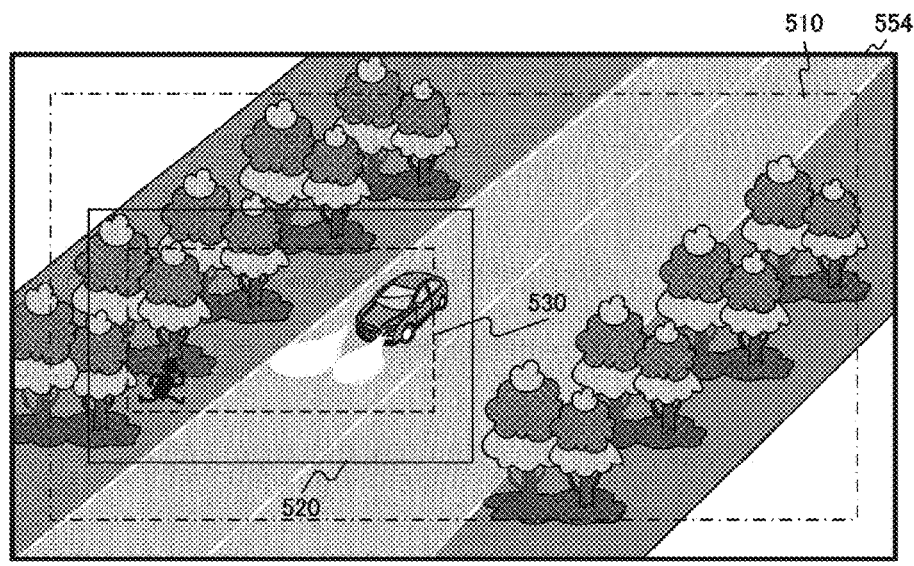
a
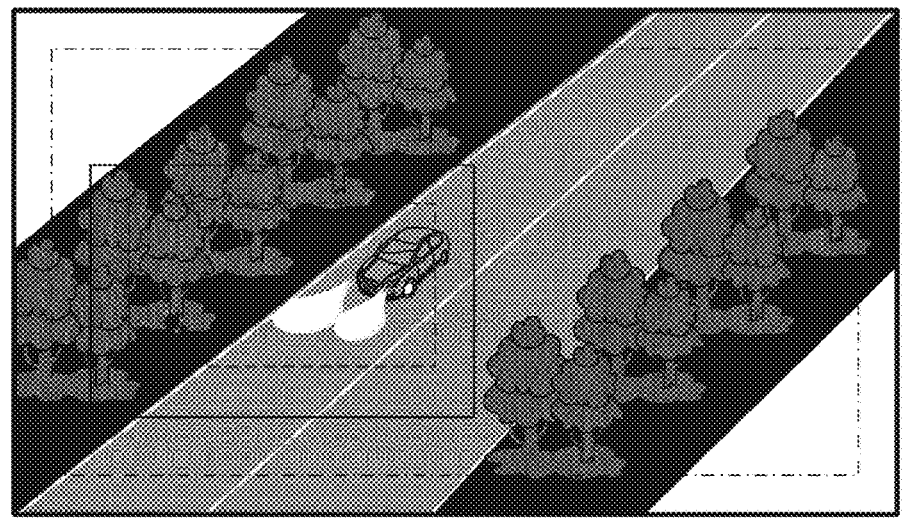
b

FIG. 14
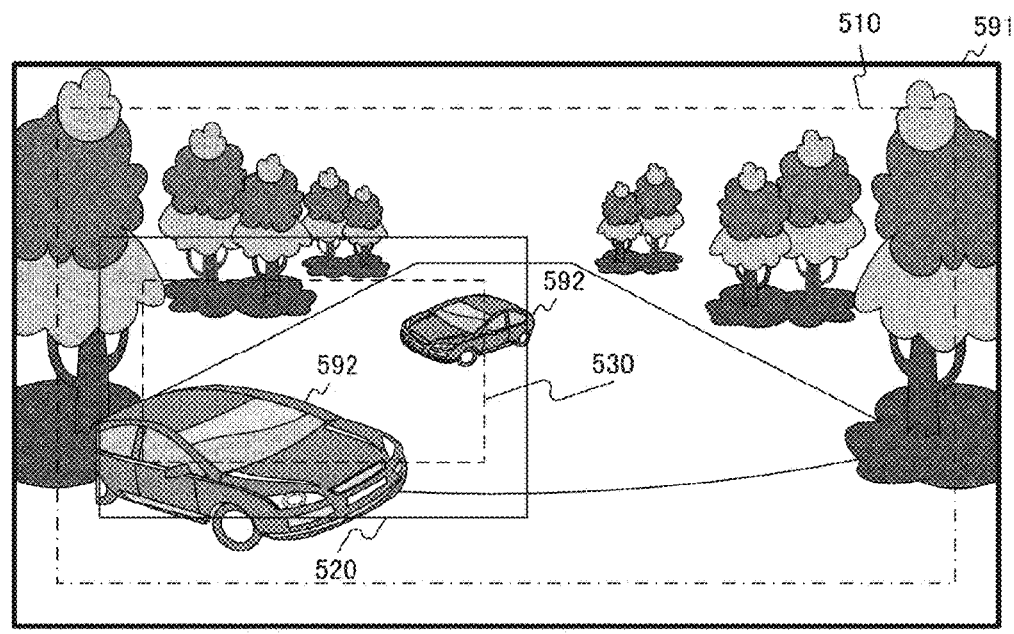
a
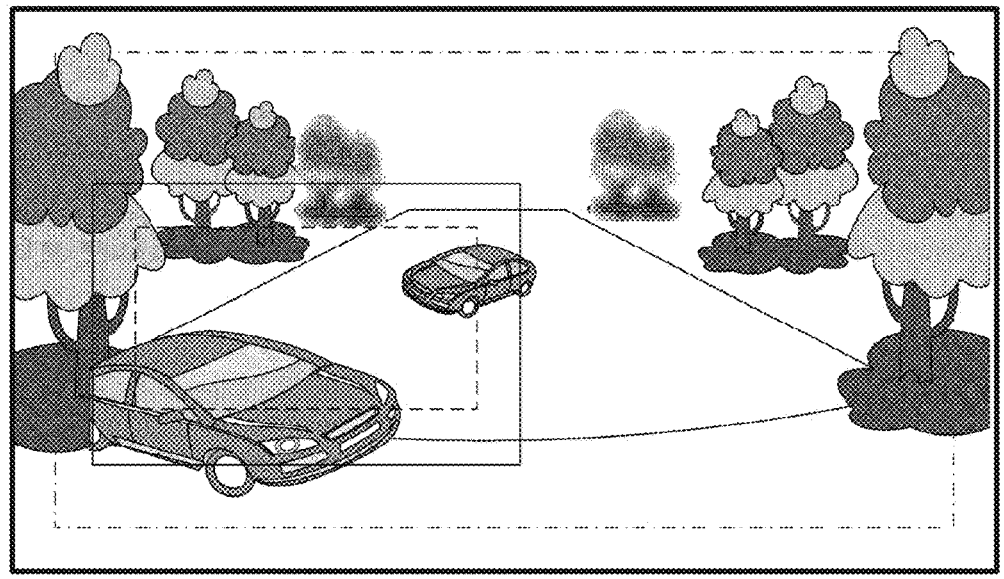
b

IMAGE CAPTURE CONTROL APPARATUS, IMAGE CAPTURE APPARATUS, AND METHOD OF CONTROLLING IMAGE CAPTURE APPARATUS

CROSS-REFERENCE TO RELATED APPLICATIONS

This application is a National Stage of International Application No. PCT/JP2015/069744, filed in the Japanese Patent Office as a Receiving office on Jul. 9, 2015, which claims priority to Japanese Patent Application Number 2014-174735, filed in the Japanese Patent Office on Aug. 29, 2014, each of which is hereby incorporated by reference in its entirety.

TECHNICAL FIELD

The present invention relates to an image capture control apparatus, an image capture apparatus, and a method of controlling an image capture apparatus. Specifically, the present invention relates to an image capture control apparatus that performs trimming, an image capture apparatus, and a method of controlling an image capture apparatus.

BACKGROUND ART

In the related art, an image capture apparatus controls panning, tilting, or zooming as necessary when an image is captured. Here, panning is control for horizontally moving a display range of a monitor, tilting is control for vertically moving the display range, and zooming is control for enlarging a part of the display range. Such panning and zooming are realized by a method of physically changing an orientation of the image capture apparatus and a lens position by driving a camera platform for placing the image capture apparatus thereon, a lens control motor, and the like (see Patent Literature 1, for example) or a method of electronically performing the panning and the zooming by trimming. For the former method, there is a concern that cost and power consumption may increase due to mechanical components such as the camera platform, and there is a concern that reliability may be degraded due to failures of the mechanical components. In contrast, the latter method exhibits low cost, low power consumption, and high reliability while there is a concern that image quality may be degraded. Therefore, electronic panning and zooming are performed by trimming in many cases when emphasis is placed on advantages of cost and power consumption.

For example, an image capture apparatus that captures image data with an appropriate amount of exposure by exposure control and extracts (that is, trims) a part of the image data has been proposed (see Patent Literature 2, for example). The image capture apparatus measures the amount of exposure before capturing the image data and captures an image by controlling image capture parameters such as an aperture value and an exposure time (a so-called shutter speed) such that the measured values become suitable values.

CITATION LIST

Patent Literature

Patent Literature 1: JP H10-164420A
Patent Literature 2: JP 2008-141239A

DISCLOSURE OF INVENTION

Technical Problem

However, the aforementioned image capture apparatuses have a problem that image quality of image data is degraded when the amount of exposure rapidly changes. For example, if a moving body with high luminance moves into an extraction area from which an image is extracted, the amount of exposure in the extraction area rapidly changes. In such a case, there is a concern that since the aperture value and the shutter speed are controlled in accordance with a moving body with higher luminance, parts other than the moving body in the extraction area may lack exposure, and image quality in the extraction area may be degraded. Also when the distance to an object or a white balance rapidly changes, there is a concern that image quality may be degraded in the same manner.

The present technology was made in view of such circumstances, and an object thereof is to improve image quality of image data.

Solution to Problem

The present technology has been made to solve the above problem. A first aspect of the present technology is an image capture control apparatus and a method of controlling thereof. The image capture control apparatus includes: a moving body detection unit that detects, as a moving body area, an area of a moving body from an input frame every time the input frame captured by an image capture unit is input; a prediction unit that predicts, as a prediction area, an area corresponding to the moving body area in a next input frame following the input frame from the moving body area every time the input frame is input; a statistical information generation unit that generates statistical information by performing predetermined statistical processing on each of pixel values of pixels in either an area excluding the predicted prediction area from a specific processing area in the input frame or an area that overlaps the prediction area in the processing area every time the input frame is input; a control information generation unit that generates predetermined control information for controlling the image capture unit based on the statistical information every time the statistical information is generated; and a controller that controls the image capture unit and causes the image capture unit to capture the next input frame based on the control information every time the control information is generated. This leads to an effect that the control information is generated based on the statistical information of the image from the specific processing area excluding the prediction area in the input frame.

According to the first aspect, the image capture control apparatus may further includes an image extraction unit that extracts an extraction area including at least a part of the processing area in the input frame. This leads to an effect that the extraction area including at least a part of the processing area is extracted.

According to the first aspect, the image extraction unit may extract the extraction area every time the input frame is input a plurality of times. This leads to an effect that the extraction area is extracted each of a plurality of times the input frame is input.

According to the first aspect, the extraction area may include the entire processing area. This leads to an effect that the extraction area including the entire processing area is extracted.

According to the first aspect, the processing area may include the entire extraction area. This leads to an effect that the extraction area included in the processing area is extracted.

A second aspect of the present technology is an image capture apparatus including: an image capture unit that images an input frame a plurality of times; a prediction unit that predicts, as a prediction area, an area corresponding to the moving body area in a next input frame following the input frame from the moving body area every time the input frame is input; a statistical information generation unit that generates statistical information by performing predetermined statistical processing on each of pixel values of pixels in either an image excluding the predicted prediction area from a specific processing area in the input frame or an area that overlaps the prediction area in the processing area every time the input frame is input; a statistical information generation unit that generates statistical information by performing predetermined statistical processing on each of pixel values of pixels in an area excluding a prediction area predicted in an input frame before the input frame from the specific processing area in the input frame every time the input frame is input; a control information generation unit that generates predetermined control information for controlling the image capture unit based on the statistical information every time the statistical information is generated; and a controller that controls the image capture unit and causes the image capture unit to capture the next input frame based on the control information every time the control information is generated. This leads to an effect that the control information is generated based on the statistical information of the image from the processing area excluding the prediction area in the input frame.

According to the second aspect, the image capture unit may perform exposure with light intensity adjusted in accordance with an aperture value during an exposure time, the control information may include an amount of exposure, and the controller may control at least one of the aperture value and the exposure time based on the amount of exposure. This leads to an effect that at least one of the aperture value and the exposure time is controlled based on the amount of exposure.

According to the second aspect, the image capture unit may include a focus lens, the control information may include distance information regarding a distance to an object, and the controller may control a position of the focus lens based on the distance information. This leads to an effect that the position of the focus lens is controlled based on the distance information.

According to the second aspect, the image capture unit may include an image sensor that generates a plurality of pieces of pixel data with mutually different colors, and a signal processing unit that amplifies the pixel data using a predetermined gain, the control information may include statistical amounts of pixel values of the pixel data for each color, and the controller may control the gain for each color based on the statistical amounts. This leads to an effect that a gain is controlled for each color based on the statistical amount.

Advantageous Effects of Invention

According to the present technology, it is possible to achieve an excellent effect that image quality of image data can be improved. The effects described herein are not necessarily limited, and any of the effects described in the disclosure may be achieved.

BRIEF DESCRIPTION OF DRAWINGS

FIG. 11 is a diagram illustrating an example of a frame according to the first embodiment.

FIG. 14 is a diagram illustrating an example of a frame according to the first modification example of the first embodiment.

MODE(S) FOR CARRYING OUT THE INVENTION

Hereinafter, embodiments for performing the present technology (hereinafter, referred to as embodiments) will be described. The description will be given in the following order.
1. First embodiment (Example in which amount of exposure is obtained by masking prediction area)
2. Second embodiment (Example in which amount of exposure is obtained by masking prediction area and generating an extracted image for each of plurality of frames)

First Embodiment

[Configuration Example of Image Capture System]

Figure 1:
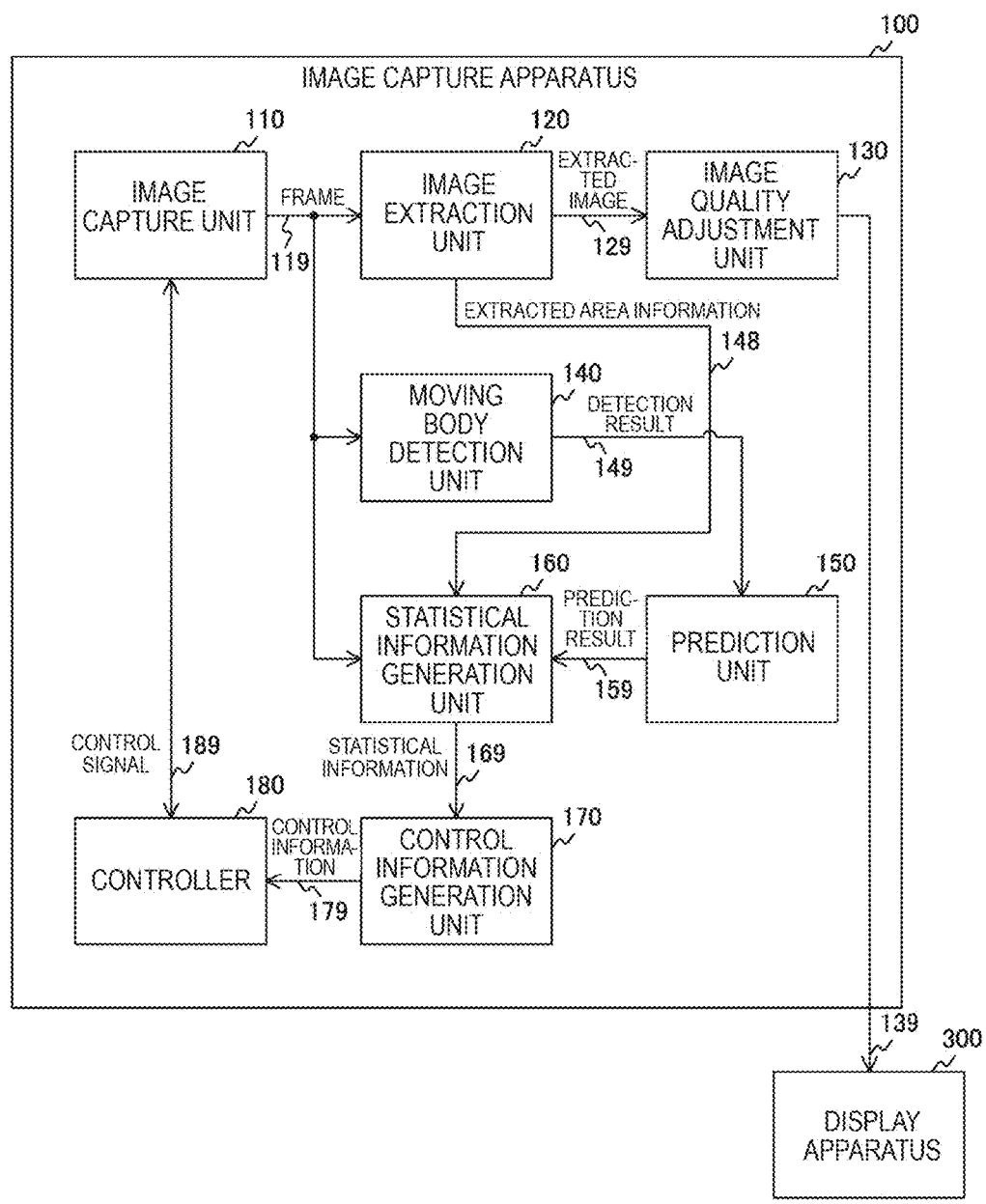
FIG. 1 is a block diagram illustrating a configuration example of an image capture system according to a first embodiment.

FIG. 1 is a block diagram illustrating an example of an image capture system according to an embodiment. The image capture system includes an image capture apparatus 100 and a display apparatus 300. The image capture apparatus 100 includes an image capture unit 110, an image extraction unit 120, an image quality adjustment unit 130, a moving body detection unit 140, a prediction unit 150, a statistical information generation unit 160, a control information generation unit 170, and a controller 180.

The image capture unit 110 captures an image (frame) a plurality of times in accordance with control performed by the controller 180. The image capture unit 110 supplies each captured frame as an input frame to the image extraction unit 120, the moving body detection unit 140, and the statistical information generation unit 160 in order via a signal line 119.

The image extraction unit 120 extracts (that is, trims), as an extracted image, an image in an extraction area corresponding to a part in the input frame and supplies the extracted image to the image quality adjustment unit 130 via a signal line 129. The position and the shape of the extraction area are set in advance in response to a user's operation, for example. The image extraction unit 120 can change the position and the shape of the extraction area in response to a user's operation. The image extraction unit 120 supplies extraction area information indicating the position and the shape of the extraction area to the statistical information generation unit 160 via a signal line 148. If the extraction area is a rectangular range, for example, two sets of coordinates at diagonally opposite vertices of the extraction area are sent as the extraction area information. Alternatively, an aspect ratio of the extraction area is fixed, and specific coordinates (such as center coordinates) in the extraction area and the size (the area or the length of a side) of the extraction area are sent as the extraction area information.

The image quality adjustment unit 130 performs predetermined image processing on the extracted image and adjusts image quality of the extracted image. Image processing such as processing for reducing noise and processing for changing the resolution, for example, is performed. The image quality adjustment unit 130 outputs the extracted image with the adjusted image quality to the display apparatus 300 via a signal line 139.

The moving body detection unit 140 detects, as a moving body area, an area of a moving body in a predetermined moving body detection area in the input frame every time the input frame is input. The moving body detection unit 140 detects the moving body area by using a background difference algorithm or an inter-frame difference algorithm, for example and generates a detection result including label information, position information, and shape information for each frame. Here, the label information is identification information for identifying the moving body area, and unique label information is assigned to each moving body area. The position information is information indicating the position of the moving body area, and coordinates of a center of gravity of the moving body area or coordinates of all pixels in the moving body area are used as the position information. The shape information is information for specifying the shape and the size of the moving body area. However, no shape information is necessary if the position information includes the coordinates of all the pixels in the moving body area.

When the background difference algorithm is used, the moving body detection unit 140 generates a difference frame between a captured input frame and a predetermined background frame, for example. The image capture apparatus performs labeling processing for assigning label information to an area in which pixels with pixel values whose difference values are equal to or greater than a threshold value are consecutive, for example, in the difference frame. In the labeling processing, a four-pixel coupling algorithm of coupling pixels that are consecutive in a horizontal or vertical direction, an eight-pixel coupling algorithm of coupling pixels that are consecutive in the horizontal, vertical, or an oblique direction, or the like is used. The moving body area is detected by such processing. The moving body detection unit 140 supplies the detection result to the prediction unit 150 via the signal line 149.

The prediction unit 150 predicts, as a prediction area, an area corresponding to the moving body area in a next input frame following such input frames from the moving body area detected in the plurality of input frames. The prediction unit 150 detects a motion vector from a plurality of moving body areas, and supplies data including the motion vector and the latest moving body area in a chronological order, for example, as a prediction result to the statistical information generation unit 160 via the signal line 159. The motion vector is a vector with a direction indicating a direction in which the moving body moves and with a size indicating a speed at which the moving body moves. The prediction unit 150 may generate the prediction area by moving the latest moving body area in accordance with the motion vector and may supply only the prediction area as the prediction result.

Here, when the motion vector is generated, the prediction unit 150 sets the moving body area in the input frame immediately before the latest input frame as a target area, and searches for a moving body area that is similar to the target area in the latest input frame. In the searching, an area of M (M is an integer that is equal to or greater than two)×M pixels around reference coordinates (such as coordinates of a center of gravity) of the target area is set as a search area. The prediction unit 150 obtains, as corresponding pixels, pixels of the same relative coordinates as those of the respective pixels in the target area in each moving body area with the reference coordinates included in the search area. Then, the prediction unit 150 obtains, as a similarity, a sum of squared differences (SSD) of differences of pixel values of the corresponding pixels, a sum of absolute differences (SAD), or the like.

The prediction unit 150 acquires a moving body area with the highest similarity in the search area as a moving body area corresponding to the target area. Then, the prediction unit 150 detects, as a past vector, a vector that starts from the reference coordinates in the target area as a start point and ends at the reference coordinates in the acquired moving body area as an end point. The prediction unit 150 detects, as a motion vector indicating the prediction area, a vector that has the same direction and size as those of the past vector and starts from the reference coordinates in the acquired moving body area. The prediction unit 150 updates the label information of the acquired moving body area to the same value as that of the target area.

The statistical information generation unit 160 generates statistical information by performing statistical processing on a predetermined processing area in an input frame every time the input frame is input. For example, a specific area in the extraction area is set as the processing area. As the statistical information, a distribution of pixel values (such as luminance values) of pixels in the processing area, for example, is generated. However, if at least a part of the prediction area predicted in the previous frame overlaps with the processing area, the statistical information generation unit 160 performs the statistical processing while excluding (that is, masking) the part overlapping with the prediction area. A distribution in the masked part is interpolated from the surrounding pixel values, for example. Alternatively, the distribution is generated by setting a specific pixel value for each pixel value in the masked part. The statistical information generation unit 160 supplies the generated statistical information to the control information generation unit 170 via a signal line 169.

The control information generation unit 170 generates control information for controlling the image capture unit 110 based on the statistical information every time the statistical information is generated. The control information generation unit 170 obtains a statistical amount (such as an integrated value) of luminance values from the statistical information, for example, and generates, as control information, the amount of exposure from a sensitivity of the image sensor in the image capture unit 110 and the statistical amount. In the generation of the amount of exposure (in other words, light measurement), centered photometry, evaluative photometry, average photometry, spot photometry, and the like are used. The control information generation unit 170 supplies the control information to the controller 180 via a signal line 179.

The controller 180 controls the image capture unit 110 such that it captures an input frame based on the control information. The controller 180 compares the amount of exposure from the control information generation unit 170 and a set value and generates a control signal for controlling at least one image capture parameter of the aperture value and the exposure time such that the amount of exposure becomes the set value, for example. Here, the aperture value and the amount of exposure are controlled in an aperture priority mode or a shutter priority mode. The aperture priority mode is a mode in which the aperture value is fixed and the exposure time is controlled, and the shutter priority mode is a mode in which the exposure time is fixed and the aperture value is controlled. The controller 180 supplies the generated control signal to the image capture unit 110 via a signal line 189.

The apparatus provided with the image extraction unit 120, the image quality adjustment unit 130, the moving body detection unit 140, the prediction unit 150, the statistical information generation unit 160, the control information generation unit 170, and the controller 180 is an example of the image control apparatus described in the claims.

The display apparatus 300 displays the extracted image from the image capture apparatus 100.

[Configuration Example of Image Capture Unit]

Figure 2:
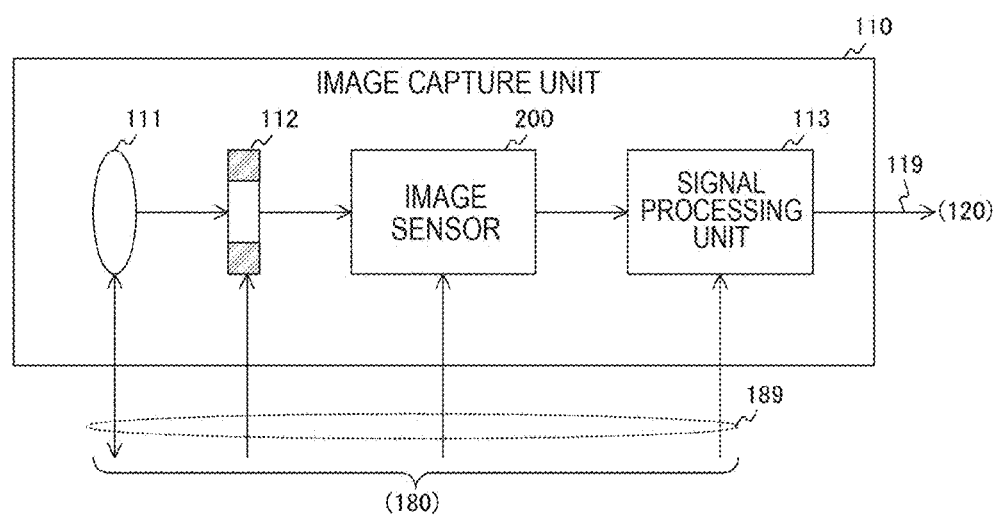
FIG. 2 is a block diagram illustrating a configuration example of an image capture unit according to the first embodiment.

FIG. 2 is a block diagram illustrating a configuration example of the image capture unit 110 according to the first embodiment. The image capture unit 110 includes an image capture lens 111, a diaphragm blade 112, an image sensor 200, and a signal processing unit 113.

The image capture lens 11 is a lens that collects light and guides the light to the image sensor 200. The image capture lens 11 includes a focus lens, for example. The image capture lens 111 changes the position thereof in accordance with control performed by the controller 180.

The diaphragm blade 112 is a blocking object that adjusts intensity of light passing therethrough in accordance with control performed by the controller 180. The aperture value is controlled by the adjustment of the light intensity.

The image sensor 200 captures a frame by converting light into an electric signal. As the image sensor 200, a CMOS (Complementary Metal Oxide Semiconductor Image Sensor) sensor, for example, is provided. The image sensor 200 is not limited to a CMOS sensor and may be a CCD (Charge Coupled Device) sensor. The image sensor 200 captures the frame and supplies the frame to the signal processing unit 113.

The signal processing unit 113 performs predetermined signal processing on the frame. For example, white balance control processing, data compression processing, and the like are performed as the signal processing. The signal processing unit 113 supplies the frame after the signal processing as the input frame to the image extraction unit 120, the moving body detection unit 140, and the statistical information generation unit 160.

[Configuration Example of Image Sensor]

Figure 3:
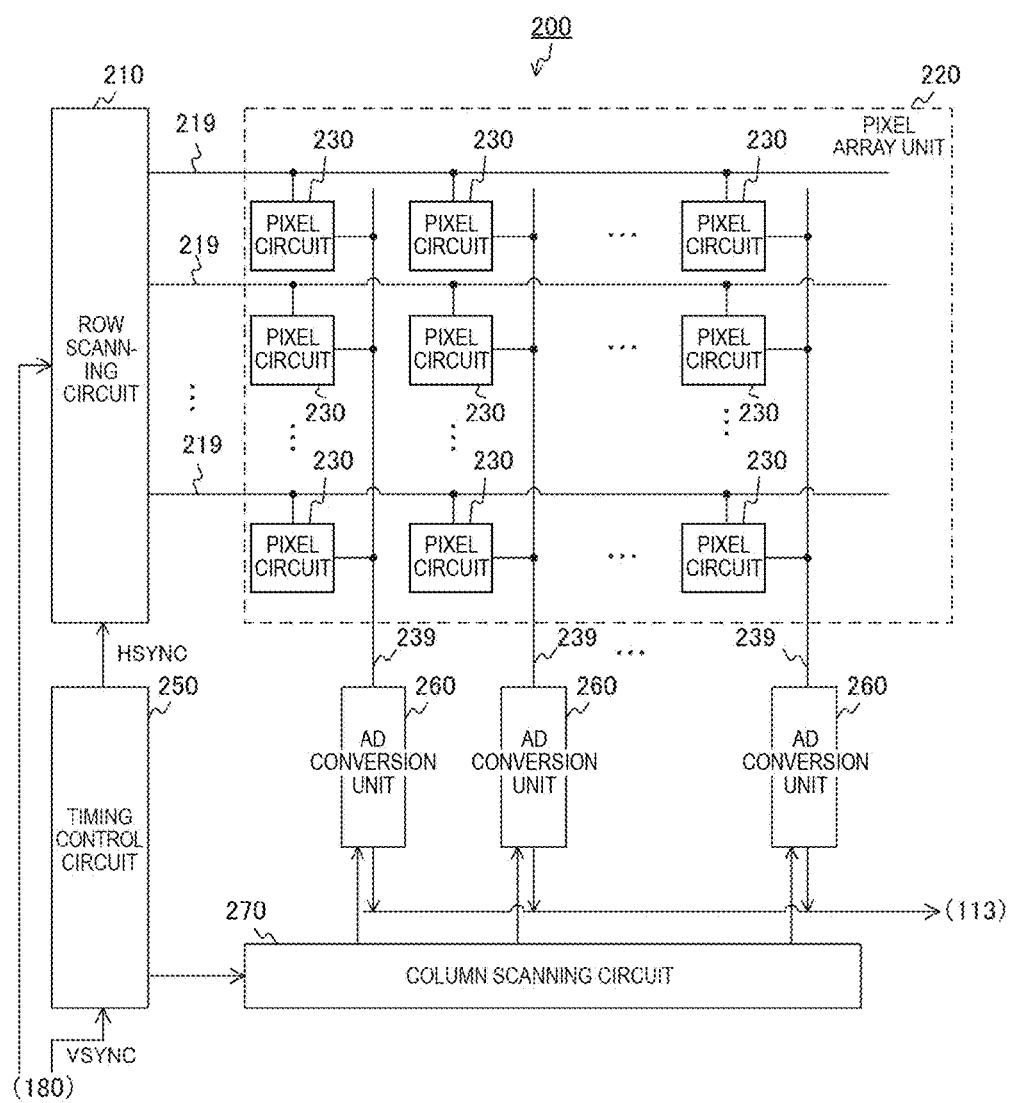
FIG. 3 is a block diagram illustrating a configuration example of an image sensor according to the first embodiment.

FIG. 3 is a block diagram illustrating a configuration example of the image sensor 200 according to the first embodiment. The image sensor 200 includes a row scanning circuit 210, a pixel array unit 220, a timing control circuit 250, an AD (Analog to Digital) conversion unit 260, and a column scanning circuit 270. The pixel array unit 220 is provided with a plurality of pixel circuits 230 in a two-dimensional grid shape.

The timing control circuit 250 controls column and row scanning timing. Here, rows correspond to the plurality of pixel circuits 230 aligned in a specific direction in the pixel array unit 220 and are also referred to as lines. Columns correspond to the plurality of pixel circuits 230 aligned in a direction that perpendicularly intersects the rows in the pixel array unit 220. The pixel circuits are aligned in n rows and m columns in the pixel array unit 220. Here, n and m are integers.

The timing control circuit 250 generates a horizontal synchronization signal Hsync for instructing timing at which the rows are to be scanned in a synchronized manner with a vertical synchronization signal Vsync and supplies the horizontal synchronization signal Hsync to the row scanning circuit 210. The timing control circuit 250 generates a timing signal for instructing timing at which the columns are to be scanned in a synchronized manner with the horizontal synchronization signal Hsync and supplies the timing signal to the column scanning circuit 270.

The row scanning circuit 210 selects the respective rows in a synchronized manner with the horizontal synchronization signal Hsync. The row scanning circuit 210 selects the rows by sequentially outputting a row selection signal to each of the rows via a signal line 219.

The row scanning circuit 210 exposes each row every time the row is selected. The row scanning circuit 210 starts exposure of the first row when a predetermined time that is less than a period of the vertical synchronization signal has passed after an imaging timing indicated by the vertical synchronization signal. Exposure of the second and following rows is started when 1/fs seconds has passed after the start of the exposure of the immediately previous row. Here, fs is a frequency of the horizontal synchronization signal Hsync. Then, the row scanning circuit 210 completes the exposure of each row when the exposure time set by the controller 180 has elapsed after the start of the exposure of the row. Here, the exposure time is time set by the controller 180.

The pixel circuit 230 generates a pixel signal of a potential in accordance with the exposure time. The pixel circuit 230 supplies the generated pixel signal to the AD conversion unit 260 via a signal line 239 of a corresponding column.

The AD conversion unit 260 generates pixel data by AD converting the pixel signal. The AD conversion unit 260 is provided for each column. The AD conversion unit of a column selected by the column scanning circuit 270 supplies the generated pixel data to the signal processing unit 113. Although each AD conversion unit 260 is provided inside the image sensor 200, the invention is not limited to this configuration, and a configuration is also applicable in which each AD conversion unit 260 is provided inside the signal processing unit 113 outside the image sensor 200.

The column scanning circuit 270 selects each row in accordance with the timing signal. The column scanning circuit 270 selects the columns by sequentially outputting a column selection signal to each AD conversion unit 260 in accordance with the timing signal.

[Configuration Example of Pixel Circuit]

Figure 4:
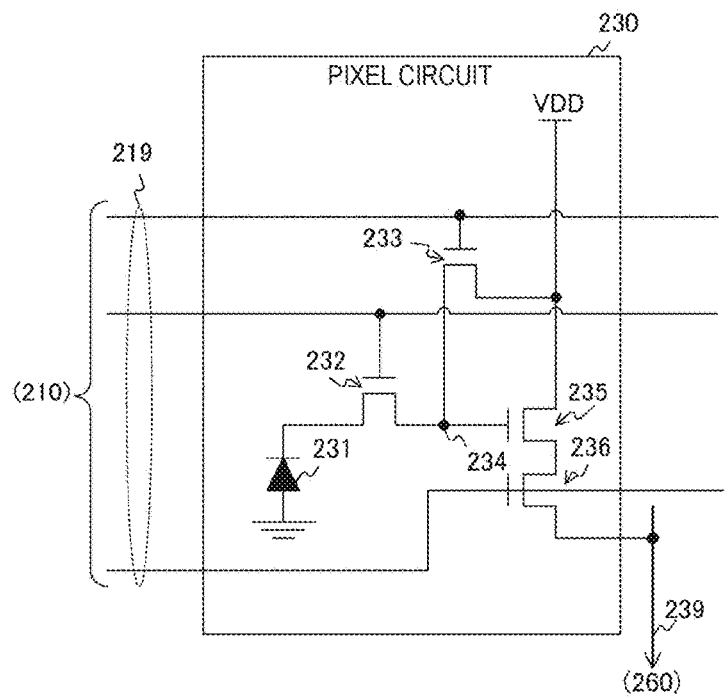
FIG. 4 is a circuit diagram illustrating a configuration example of a pixel circuit according to the first embodiment.

FIG. 4 is a circuit diagram illustrating a configuration example of the pixel circuit 230 according to the first embodiment. The pixel circuit 230 includes a photodiode 231, a transfer transistor 232, a reset transistor 233, a floating diffusion layer 234, an amplification transistor 235, and a selection transistor 236. As the transfer transistor 232, the reset transistor 233, the amplification transistor 235, and the selection transistor 236, n-type MOS (metal-oxide-semiconductor) transistors, for example, are used.

The photodiode 231 is connected to a source of the transfer transistor 232. A gate of the transfer transistor 232 is connected to the row scanning circuit 210, and a drain thereof is connected to the floating diffusion layer 234. A gate of the reset transistor 233 is connected to the row scanning circuit 210, a source thereof is connected to the floating diffusion layer 234, and a drain thereof is connected to a power source. A gate of the amplification transistor 235 is connected to the floating diffusion layer 234, a source thereof is connected to the power source, and a drain thereof is connected to a source of the selection transistor 236. A gate of the selection transistor 236 is connected to the row scanning circuit 210, and a drain thereof is connected to the AD conversion unit 260.

The photodiode 231 converts light into electric charge. The transfer transistor 232 transfers the electric charge converted by the photodiode 231 to the floating diffusion layer 234. The reset transistor 233 resets the amount of electric charge of the floating diffusion layer 234 to an initial value. The floating diffusion layer 234 generates a potential at a level in accordance with the amount of transferred electric charge. The amplification transistor 235 amplifies the potential of the floating diffusion layer 234. The selection transistor 236 outputs an electric signal of the amplified potential as a pixel signal to the AD conversion unit 260 when the pixel circuit 230 is selected.

The row scanning circuit 210 selects the pixel circuit 230 by applying a high-level voltage to the selection transistor 236. The row scanning circuit 210 starts the exposure by applying a high-level voltage to the reset transistor 233 during a predetermined pulse period. Then, the row scanning circuit 210 completes the exposure by applying a high-level voltage to the transfer transistor 232 during a predetermined pulse period after elapse of the exposure time. By such control, the electric signal of the potential in accordance with the exposure time is generated.

The method of electronically controlling the exposure time by controlling the pixel circuit 230 as described above is referred to as an electronic shutter method. The image capture apparatus 100 may use a mechanical shutter method instead of the electronic shutter method. In the mechanical shutter method, a shutter such as a focal plane shutter is provided between the image capture lens 111 and the image sensor 200, and the controller 180 controls the timing of opening and closing the shutter.

[Configuration Example of Moving Body Detection Unit]

Figure 5:
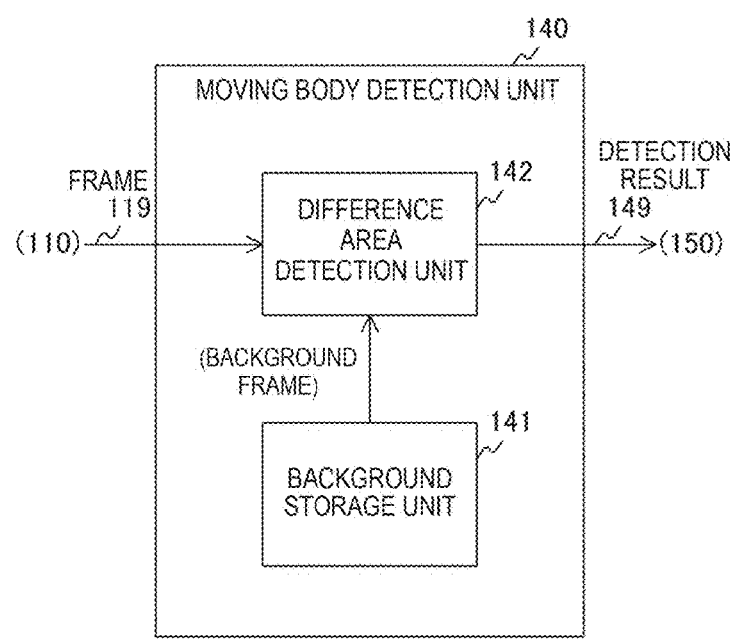
FIG. 5 is a block diagram illustrating a configuration example of a moving body detection unit according to the first embodiment.

FIG. 5 is a block diagram illustrating a configuration example of the moving body detection unit 140 according to the first embodiment. The moving body detection unit 140 includes a background storage unit 141 and a difference area detection unit 142.

The background storage unit 141 stores a background frame. Here, the background frame is a frame in which no moving body area has been detected. For example, a frame set in advance before image capture is used as the background frame. Alternatively, an average value of pixel values in a plurality of past frames is obtained for each pixel of the same coordinates, and a frame including the pixels of the average value is used as the background frame.

The difference area detection unit 142 reads the background frame in the background storage unit 141 and detects, as a moving body area, an area with a difference between the background frame and the input frame from the image capture unit 110. The difference area detection unit 142 generates exposure amount maps of the input frame and the background frame, respectively, and obtains a difference therebetween, for example. Here, the exposure amount maps are data indicating the amounts of exposure in accordance with luminance values for each block when the frames are divided into a plurality of blocks. Each block is formed of a plurality of pixels such as 3×3 pixels or 5×5 pixels. Also, an exposure amount map generated in advance before capturing the input frame may be used as the exposure amount map of the background frame. Obtaining the difference between the exposure amount maps makes it possible to reduce the amount of processing in comparison to a case of obtaining a difference for each pixel.

The difference area detection unit 142 may generate luminance value maps of the input frame and the background frame, respectively, and obtain a difference therebetween. Here, the luminance value maps are data indicating the statistical amount (an average or a sum) of luminance values for each block. Each block is formed of a plurality of pixels such as 3×3 pixels or 5×5 pixels. The difference area detection unit 142 may obtain a difference of pixel values for each pixel without generating the exposure amount maps.

The difference area detection unit 142 compares a difference obtained by subtracting the background frame from the input frame with a predetermined threshold value and detects an area with a difference that is greater than the threshold value as a moving body area. An area with brightness that is different from that in the background frame to some extent is detected as the moving body area in the input frame by the comparison with the threshold value. The difference area detection unit 142 may directly detect the difference area as the moving body area without comparing the difference with the threshold value.

Figure 6:
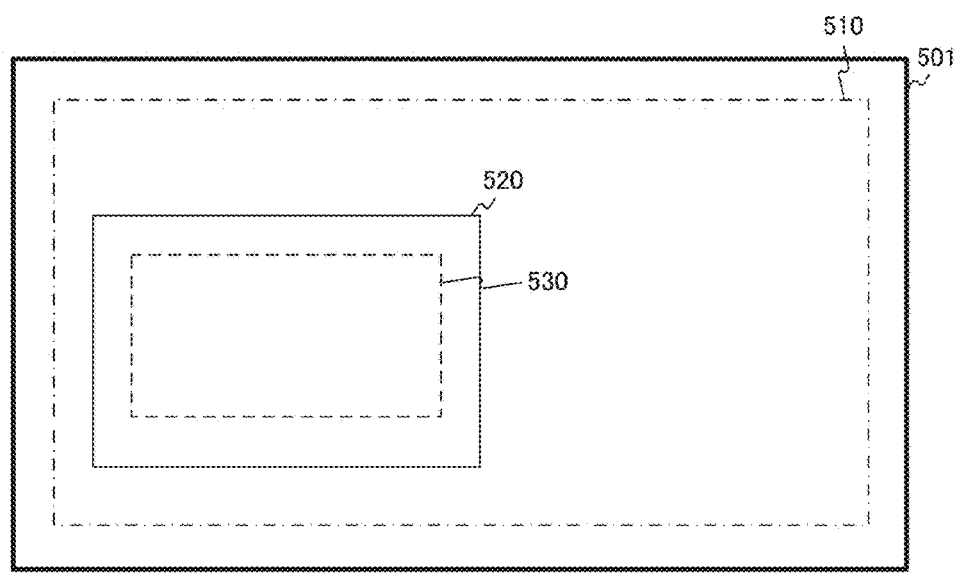
FIG. 6 is a diagram illustrating an example of a moving body detection area, an extraction area, and a processing area according to the first embodiment.

FIG. 6 is a diagram illustrating an example of a moving body detection area, an extraction area, and a measurement area according to the first embodiment. As illustrated in the drawing, a moving body detection area 510, an extraction area 520, and a processing area 530 are set in the input frame 501. For example, an area surrounded by line segments that are away from the outer periphery of the frame 501 by a predetermined distance may be set as the moving body detection area 510. A configuration is also applicable in which the entire frame is set as the moving body detection area.

For example, a predetermined area in the moving body detection area 510 may be set as the extraction area 520. Also, an area, which is surrounded by line segments that are away from the outer periphery of the extraction area 520, in the extraction area 520 may be set as the processing area 530, for example. The area including the entire extraction area 520 may be set as the processing area 530, or an area that also includes an area outside the extraction area 520 may be set as the processing area 530.

Figure 7:
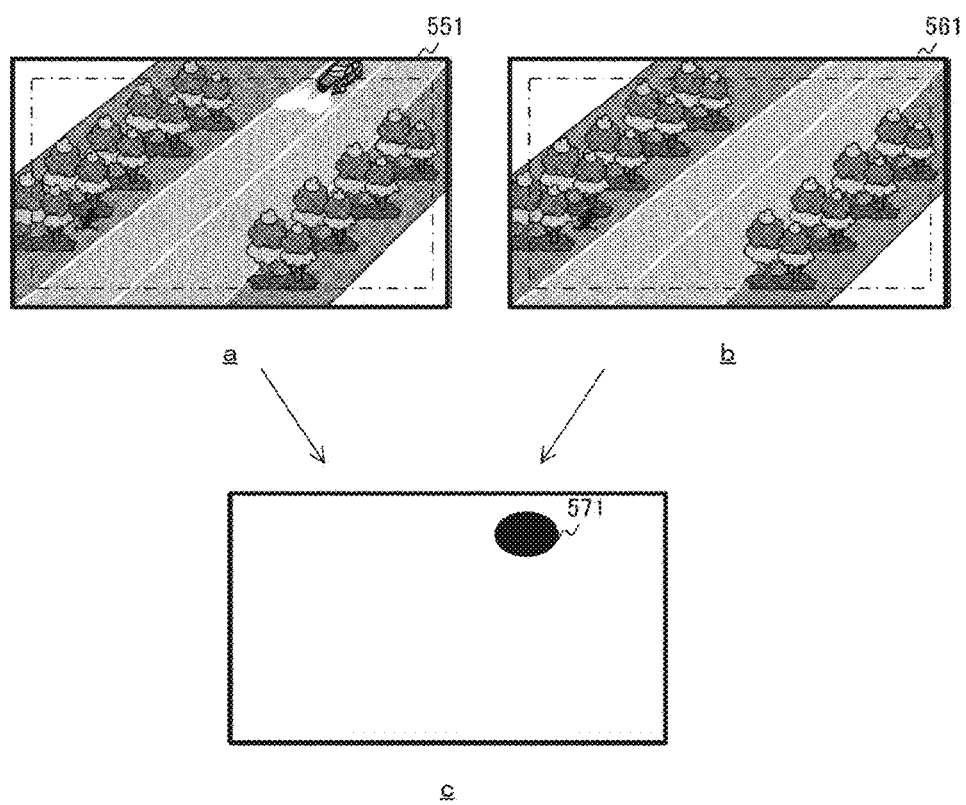
FIG. 7 is a diagram illustrating an example of a moving body detection result according to the first embodiment.

FIG. 7 is a diagram illustrating an example of a moving body detection result according to the first embodiment. In the drawing, a is an example of an input frame 551 generated by the image capture unit 110. In the drawing, b is an example of a background frame 561. A search light of a vehicle that does not appear in the background frame 561 appears in the input frame 551. Although an exposure amount map is generated in the detection of the moving body, the exposure amount map is omitted in the drawing.

In FIG. 7, c is a diagram illustrating an example of a moving body area 571 detected based on a difference between the input frame 551 and the background frame 561. The part corresponding to the search light of the vehicle is detected as the moving body area 571 in the input frame 551.

Figure 8:
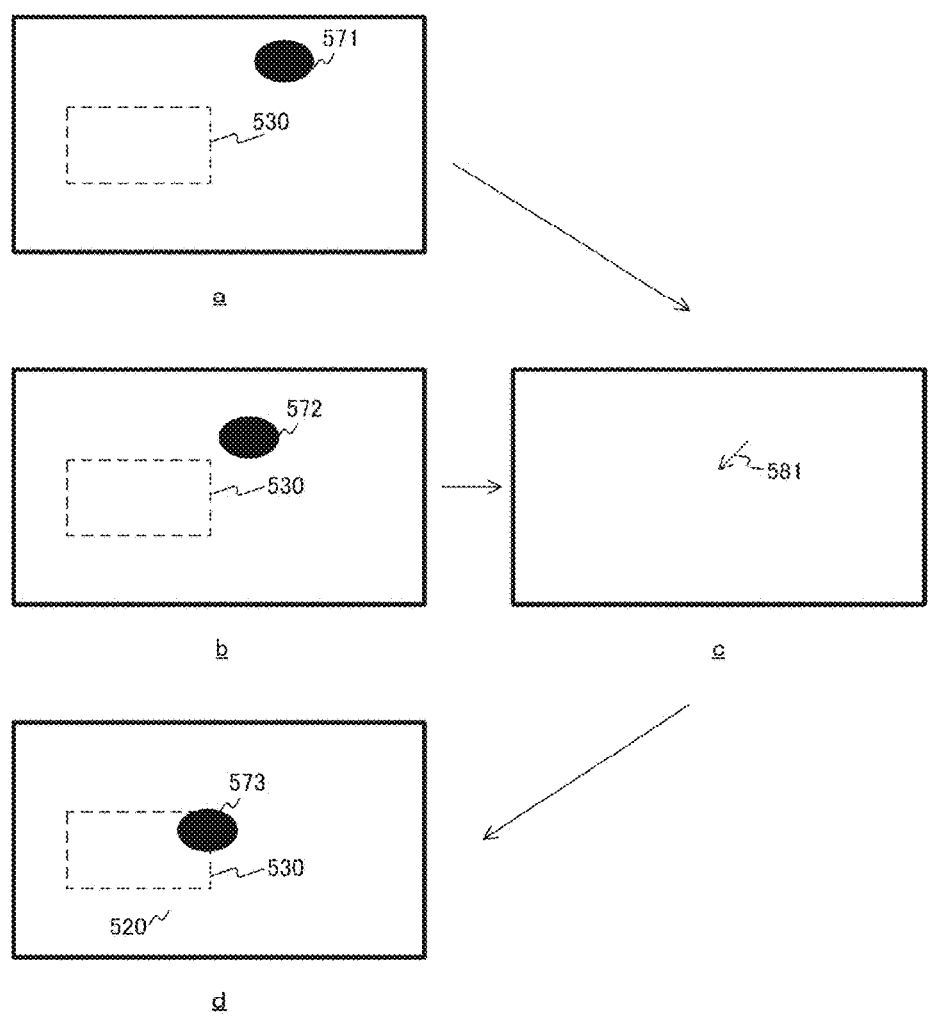
FIG. 8 is a diagram illustrating an example of a moving body area and a prediction area according to the first embodiment.

FIG. 8 is a diagram illustrating an example of a moving body area and a prediction area according to the first embodiment. In the drawing, a is a diagram illustrating an example of a moving body area 571 detected in a specific input frame F1, and in the drawing, b is a diagram illustrating an example of a moving body area 572 detected in a next frame F2 following the input frame F1. In the drawing, c is a diagram illustrating an example of a motion vector 581 obtained from the moving body areas 571 and 572. In the drawing, d is a diagram illustrating an example of a moving body prediction area 573, which has been predicted based on the moving body area 572 and the motion vector 581, in a next input frame F3 following the input frame F2.

As illustrated in FIG. 8, the image capture apparatus 100 can obtain the motion vector 581 indicating the prediction area from the moving body areas 571 and 572 in the input frames F1 and F2. Also, a prediction area 573 in the next input frame F3 following the input frame F2 is obtained based on the moving body area 572 and the motion vector 581. The prediction area 573 is assumed to overlap with the processing area 530 as illustrated in d in the drawing. In such a case, the image capture apparatus 100 acquires a luminance distribution by masking the overlapping part and obtains the amount of exposure from the luminance distribution.

Although the image capture apparatus 100 obtains the motion vector from the two frames, namely the input frame and the background frames in FIG. 8, the motion vector may be obtained from three or more frames, namely the input frames and the background frames. If three or more input frames are used, a vector with an average direction and an average size of those of a plurality of vectors detected in two consecutive input frames in a chronological order is detected as a final motion vector.

Figure 9:
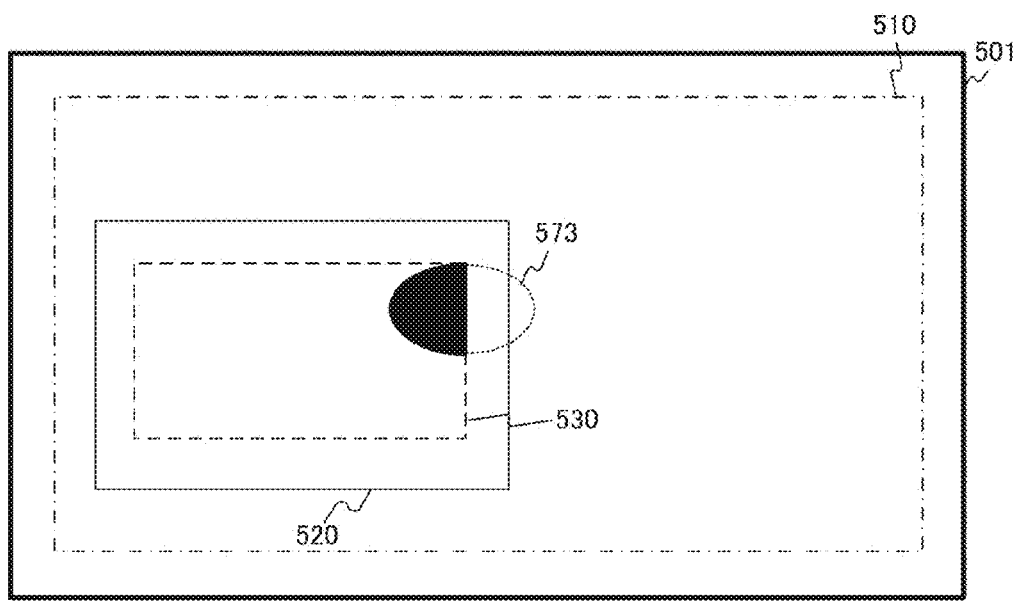
FIG. 9 is a diagram illustrating an example of mask data according to the first embodiment.

FIG. 9 is a diagram illustrating an example of mask data according to the first embodiment. If the prediction area 573 overlaps with the processing area 530, the control information generation unit 170 generates mask data for masking the overlapping part as illustrated in the drawing. In the drawing, the blacked out part represents the masked part. The control information generation unit 170 partially masks the processing area 530 based on the mask data and generates control information such as the amount of exposure.

Figure 10:
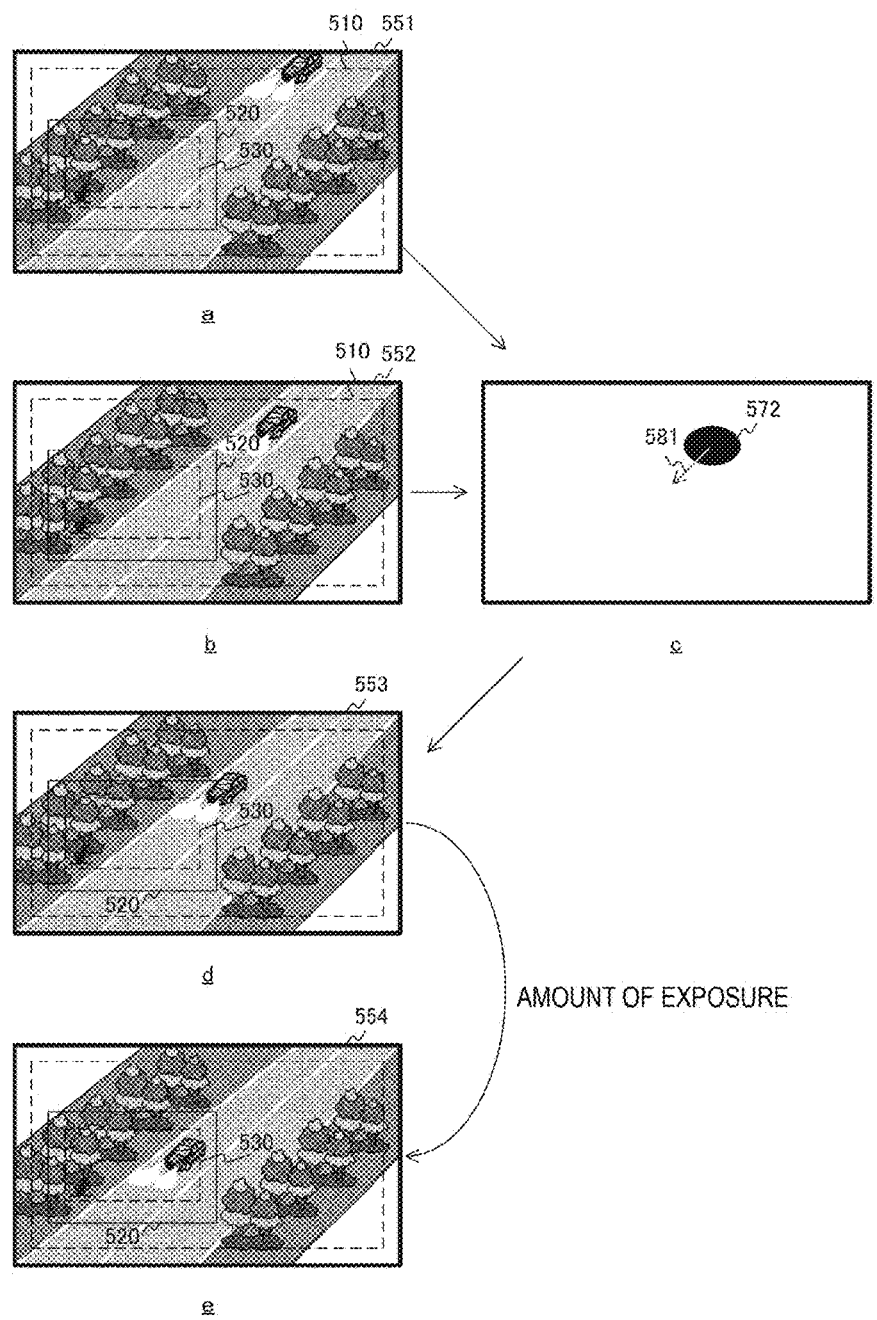
FIG. 10 is an explanatory diagram of exposure control according to the first embodiment.

FIG. 10 is an explanatory diagram of exposure control according to the first embodiment. In the drawing, a is an example of the input frame 551. In the drawing, b is an example of a next input frame 552 following the input frame 551. In the drawing, c is an example of the moving body area 572 and the motion vector 581 detected from the input frames 551 and 552. In the drawing, d is an example of a next input frame 553 following the input frame 552.

The search light of the vehicle that does not appear in the background frame appears in the input frame 551, and the search light does not overlap with the processing area 520. The search light also appears in the input frame 552, and the search light has approached the processing area 520 in comparison to that in the input frame 551 though the search light does not overlap with the processing area 520.

The image capture apparatus 100 detects a search light area as the moving body area 572 from the input frames 551 and 552 and detects the motion vector 581 thereof. Then, the image capture apparatus 100 predicts an area corresponding to the moving body in the next frame 553 based on the moving body area 572 and the motion vector 581 and obtains the prediction area 573. The prediction area 573 is assumed to overlap with the processing area 520. In such a case, the image capture apparatus 100 generates a luminance distribution by masking the overlapping part in the processing area 520 and generates control information including the amount of exposure from the luminance distribution. The image capture apparatus 100 controls the aperture value and the exposure time based on the amount of exposure and captures a next input frame 554.

In FIG. 10, d is an example of the input frame 554. Since the image capture apparatus 100 obtains the amount of exposure by masking the search light part with a high luminance value and performs the exposure control on the input frame 553, the amount of exposure at the part other than the moving body (such as a search light) in the next input frame 554 becomes a suitable value. As a result, it is possible to prevent image quality from being degraded due to insufficient exposure of the part other than the moving body.

FIG. 11 is a diagram illustrating an example of an input frame according to the first embodiment. In the drawing, a is an enlarged diagram of the input frame 554 illustrated in d in FIG. 10. The image capture apparatus 100 obtains the amount of exposure by masking the moving body (search light) part with the high luminance value in the previous input frame 553 and captures the input frame 554 by controlling exposure based on the amount of exposure. Therefore, insufficient exposure does not occur for the background other than the search light part in the input frame 554, and image quality is improved.

In FIG. 11, b is an example of an input frame according to a comparative example that is captured under exposure control without masking the moving body part with the high luminance value. If the exposure control is performed without masking the moving body part with the high luminance value, a larger amount of exposure than that when no mask is used is generated, and the aperture value and the like are controlled based on the large amount of exposure. As a result, insufficient exposure occurs in the background part with relatively low luminance, and image quality is degraded.

[Operation Example of Image Capture Apparatus]

Figure 12:
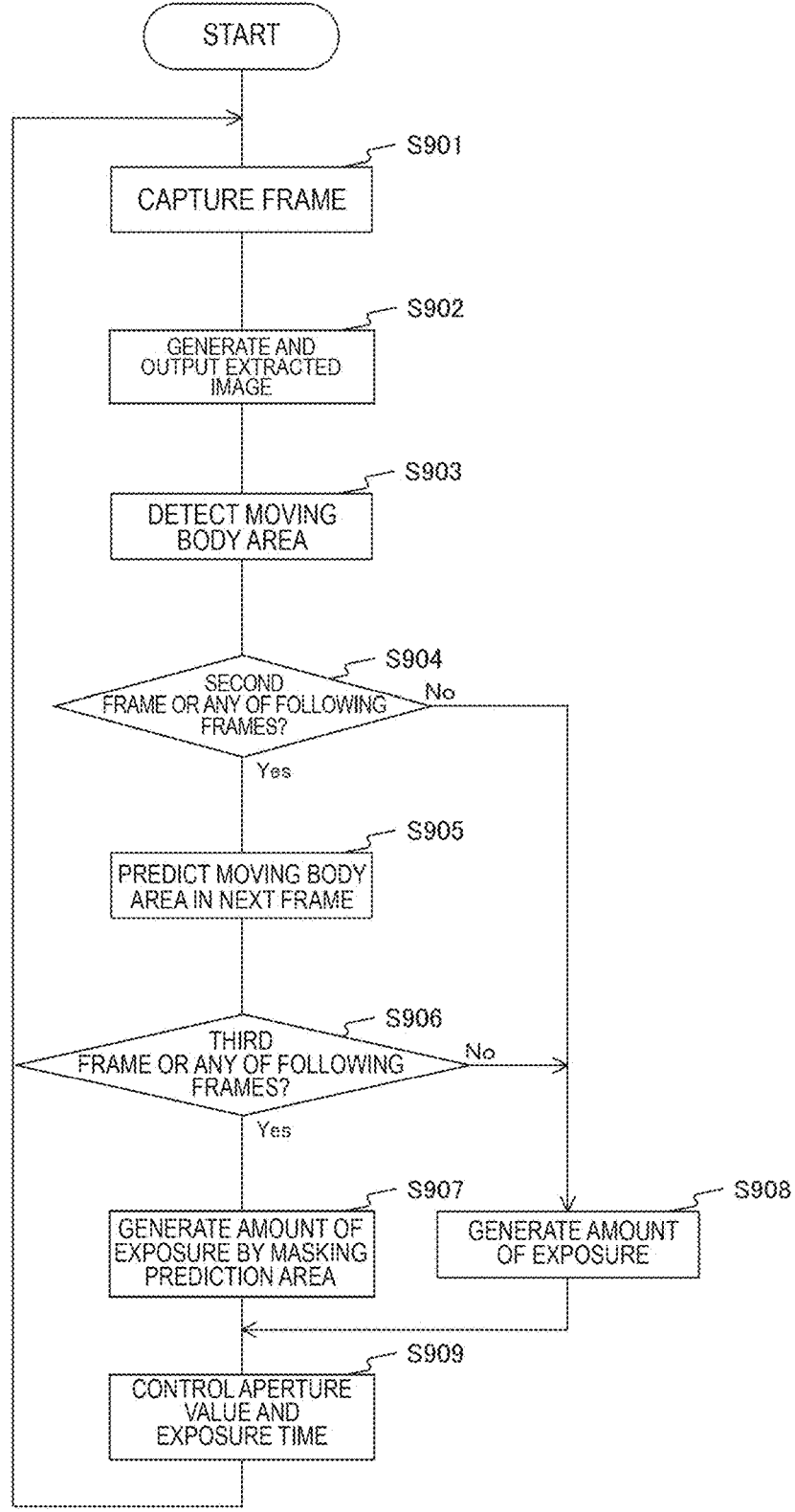
FIG. 12 is a flowchart illustrating an example of behavior of an image capture apparatus according to the first embodiment.

FIG. 12 is a flowchart illustrating an example of behavior of the image capture apparatus 100 according to the first embodiment. The behavior start when an operation for capturing a moving image is performed, for example. First, the image capture apparatus 100 captures an input frame (Step S901). The image capture apparatus 100 extracts an extraction area in the input frame, generates an extracted image, and outputs the extracted image to the display apparatus 300 (Step S902).

The image capture apparatus 100 compares the input frame and a background frame and detects a moving body area (Step S903). The image capture apparatus 100 determines whether or not the input frame is a second frame or any of the following frames (Step S904). If the input frame is the second frame or any of the following frames (Step S904: Yes), the image capture apparatus 100 predicts an area corresponding to a moving body in the next input frame as a prediction area (Step S905). The image capture apparatus 100 determines whether or not the input frame is a third frame or any of the following frames (Step S906). If the frame is the third frame or any of the following frames (Step S906: Yes), the image capture apparatus 100 masks the prediction area, which has been predicted in the previous frame, in the processing area and generates control information including the amount of exposure (Step S907). However, if the processing area and the prediction area do not overlap with each other, the image capture apparatus 100 generates the control information without masking any part.

In contrast, if the frame is not the second frame or any of the following frames (Step S904: No), or if the frame is not the third frame or any of the following frames (Step S906: No), the image capture apparatus 100 generates the control information including the amount of exposure (Step S908).

After Step S907 or S908, the image capture apparatus 100 controls the aperture value and the exposure time based on the amount of exposure (Step S909) and returns to Step S901.

According to the first embodiment of the present technology, the image capture apparatus 100 can generate appropriate control information even if the moving body overlaps with the processing area since the image capture apparatus 100 predicts the area corresponding to the moving body and generates the control information by excluding the prediction area from the processing area as described above. In this manner, it is possible to improve image quality of the part other than the moving body.

First Modification Example

Although the image capture apparatus 100 captures the frames under exposure control in the first embodiment, the frames may be captured under focus control instead of the exposure control. The image capture apparatus 100 according to the first modification example is different from that of the first embodiment in that the frames are captured under focus control.

The control information generation unit 170 according to the first modification example generates control information including distance information indicating a distance to an object from the statistical information. For example, a contrast or the like is generated as the distance information.

The controller 180 according to the second modification example controls the position of the focus lens in the image capture lens 11 based on the distance information. In the case of controlling the position based on the contrast, the position of the focus lens is controlled so as to be a position with the highest contrast.

Figure 13:
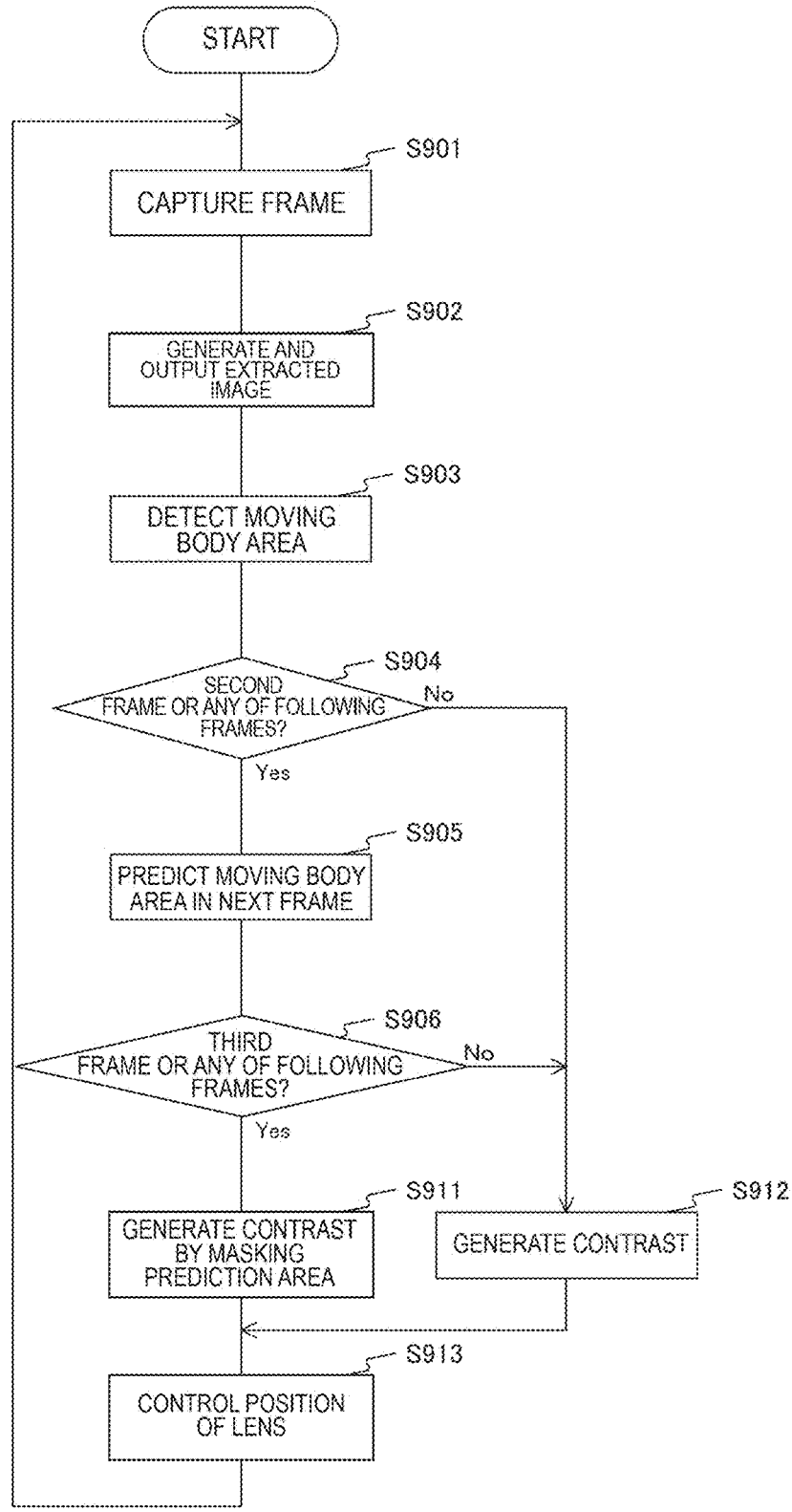
FIG. 13 is a flowchart illustrating an example of behavior of an image capture apparatus according to a first modification example of the first embodiment.

FIG. 13 is a flowchart illustrating an example of behavior of the image capture apparatus 100 according to the first modification example of the first embodiment. The behavior of the image capture apparatus 100 according to the first modification example is different from that of the first embodiment in that Steps S911 to S913 are executed instead of Steps S907 to S909.

If the input frame is the third frame or any of the following input frames (Step S906: Yes), the image capture apparatus 100 generates control information including the contrast by masking the prediction area (Step S911). If the input frame is not the second frame or any of the following frames (Step S904: No) or if the input frame is not the third frame or any of the following frames (Step S906: No), the image capture apparatus 100 generates the control information including the contrast (Step S912).

After Step S911 or S912, the image capture apparatus 100 controls the position of the focus lens based on the contrast (Step S913) and returns to Step S901.

The image capture apparatus 100 may perform both the exposure control and the focus control.

FIG. 14 is a diagram illustrating an example of an input frame 591 according to the first embodiment. The image capture apparatus 100 obtains a contrast by masking a part corresponding to a moving body 592 at a significantly different distance from that of the background in the frame before the input frame 591, and captures the input frame 591 under focus control based on the contrast. Therefore, the input frame 591 in focus on the background other than the part corresponding to the moving body 592 is obtained.

In FIG. 14, b is an example of a frame according to a comparative example that is captured under focus control without masking the part corresponding to the moving body at a significantly different distance. In the case of performing the focus control without masking the part corresponding to the moving body at the different distance, a contrast different from that in the case of not masking the part is generated, and the position of the focus lens is controlled based on the contrast. As a result, the background part at a different distance is not focused, and image quality is degraded.

According to the first modification example, the image capture apparatus 100 can generate an appropriate contrast even if the moving body overlaps with the processing area since the image capture apparatus 100 predicts the moving body area and generates the contrast while excluding the prediction area from the processing area as described above. In this manner, the image capture apparatus 100 can extract an image in focus on the part other than the moving body.

Second Modification Example

Although the image capture apparatus 100 captures frames under exposure control in the first embodiment, the frames may be captured under white balance control instead of exposure control. The image capture apparatus 100 according to the first modification example is different from that of the first embodiment in that the frames are captured under white balance control.

The statistical information generation unit 160 according to the second modification example generates a luminance distribution for each color. The control information generation unit 170 according to the second modification example generates control information including statistical amounts (a sum and an average) of pixel values for each color as color component amounts from the statistical information.

The controller 180 according to the second modification example transmits a control signal to the signal processing unit 113 and causes the signal processing unit 113 to change a gain for each color such that a ratio of the respective color component amounts becomes a set value. For example, an R gain for red pixel data, a B gain for blue pixel data, and the like are controlled. The signal processing unit 113 amplifies the pixel data using the gains controlled by the controller 180.

Figure 15:
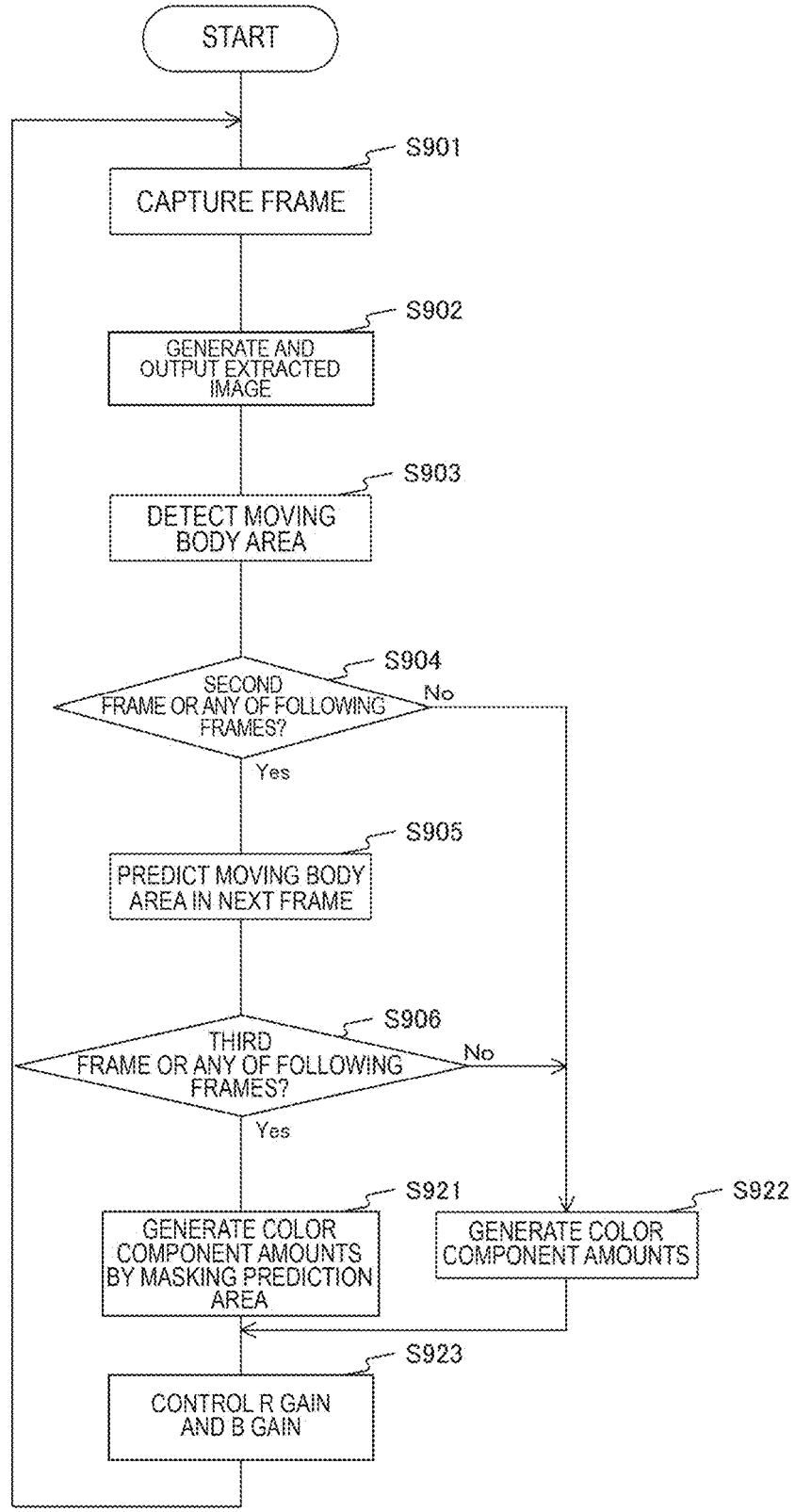
FIG. 15 is a flowchart illustrating an example of behavior of an image capture apparatus according to a second modification example of the first embodiment.

FIG. 15 is a flowchart illustrating an example of behavior of the image capture apparatus 100 according to the second modification example of the first embodiment. The behavior of the image capture apparatus 100 according to the second modification example is different from that of the first embodiment in that Steps S921 to S923 are executed instead of Steps S907 to S909.

If the input frame is the third frame or any of the following frames (Step S906: Yes), the image capture apparatus 100 generates control information including the color component amounts by masking the prediction area (Step S921). If the input frame is not the second frame or any of the following frames (Step S904: No) or if the input frame is not the third frame or any of the following frames (Step S906: No), the image capture apparatus 100 generates the control information including the color component amounts (Step S922).

After Step S921 or S922, the image capture apparatus 100 controls the R gain and the B gain based on the color component amounts (Step S923) and returns to Step S901.

The image capture apparatus 100 may perform two or more of the exposure control, the focus control, and the white balance control.

According to the second modification example, the image capture apparatus 100 can control the white balance of the part other than the moving body such that it has an appropriate value since the image capture apparatus 100 predicts the area corresponding to the moving body and generates the color component amounts while excluding the prediction area from the processing area.

Third Modification Example

Although the statistical information generation unit 160 performs the statistical processing by excluding (that is, masking) the part that overlaps with the prediction area in the first embodiment, the statistical processing may be that performed on the part that overlaps the prediction area instead of the statistical processing excluding (that is, masking) the part that overlaps with the prediction area. The statistical information generation unit 160 according to the third modification example is different from that of the first embodiment in that the statistical information generation unit 160 performs the statistical processing only on the part that overlaps with the prediction area.

The behavior of the image capture apparatus 100 according to the third modification example is different from that of the first embodiment in that the part other than the prediction area is masked instead of masking the prediction area in Step S907.

The image capture apparatus 100 may perform two or more of the exposure control, the focus control, and the white balance control.

According to the third modification example, the image capture apparatus 100 can control the control information including the amount of exposure of the moving body part such that it has an appropriate value since the image capture apparatus 100 predicts the area corresponding to the moving body and generates the control information including the amount of exposure only for the area, which overlaps with the prediction area, in the processing area as a target.

2. Second Embodiment

The image capture apparatus 100 performs the exposure control and extracts and outputs the extracted image every time a frame is captured in the first embodiment. In other words, the image capture apparatus 100 sets a frame rate at which the extracted image is output to be the same as a frame rate of the exposure control. With such a configuration, there is a concern that if the amount of exposure rapidly changes from a timing at which the amount of exposure is obtained until a timing at which image capture is performed under the exposure control based on the amount of exposure, the change may not be able to be followed and image quality of the extracted image may be degraded.

However, it is possible to minimize degradation of the image quality of the extracted image due to the rapid change in the amount of exposure by setting the frame rate at which the extracted image is output to be smaller than the frame rate of the exposure control. For example, a configuration may be conceived in which both the exposure control and the output of the extracted image are performed for even frames while only the exposure control is performed for odd frames. In such a case, there is no influence on the image quality of the extracted image since no extracted image is output from a frame F3 even if the amount of exposure changes from an even frame F2 to the next odd frame F3. If no rapid change occurs in the amount of exposure between the frame F3 to the next even frame F4, the image capture apparatus 100 can image the frame F4 with a suitable amount of exposure and output the extracted image with high image quality. The image capture apparatus 100 according to the second embodiment is different from that of the first embodiment in that the extracted image is extracted every time the plurality of frames are captured.

Figure 16:
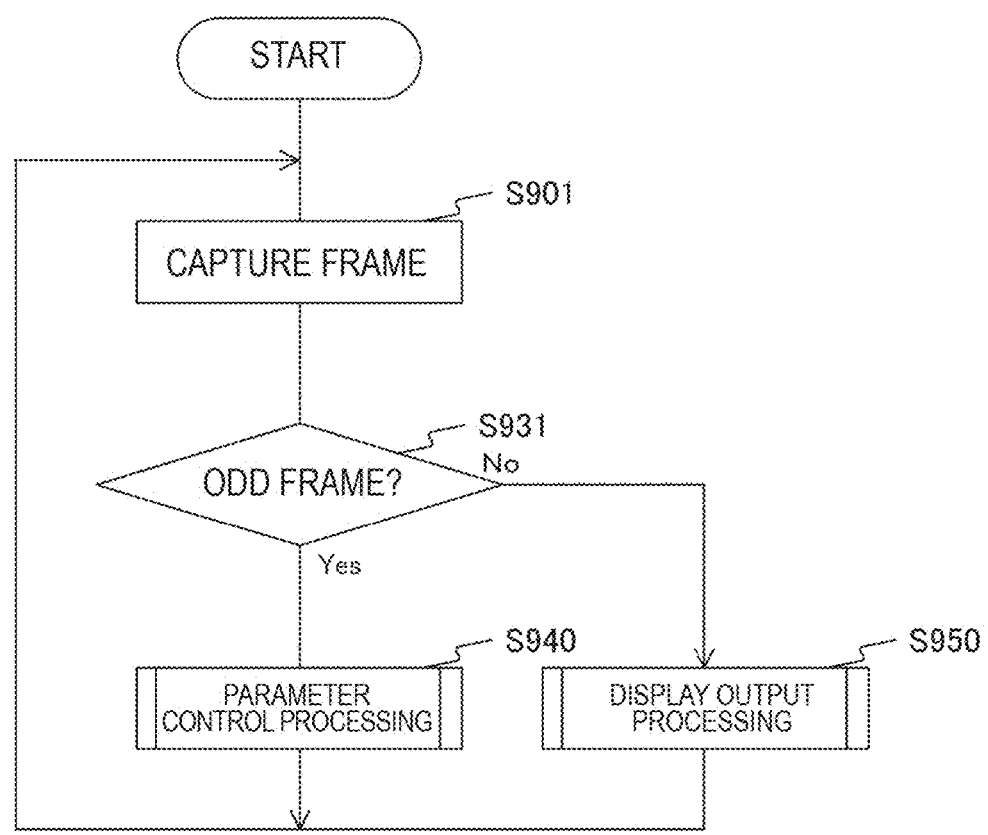
FIG. 16 is a flowchart illustrating an example of behavior of an image capture apparatus according to a second embodiment.

FIG. 16 is a flowchart illustrating behavior of the image capture apparatus 100 according to the second embodiment. The image capture apparatus 100 captures an input frame (Step S901) and determines whether or not the input frame is an odd frame of an odd number (Step S931). If the input frame is an odd frame (Step S931: Yes), the image capture apparatus 100 performs parameter control processing (Step S940). In contrast, if the input frame is an even frame (Step S931: No), the image capture apparatus 100 performs display output processing (Step S950). After Step S940 or S950, the image capture apparatus 100 returns to Step S901.

Figure 17:
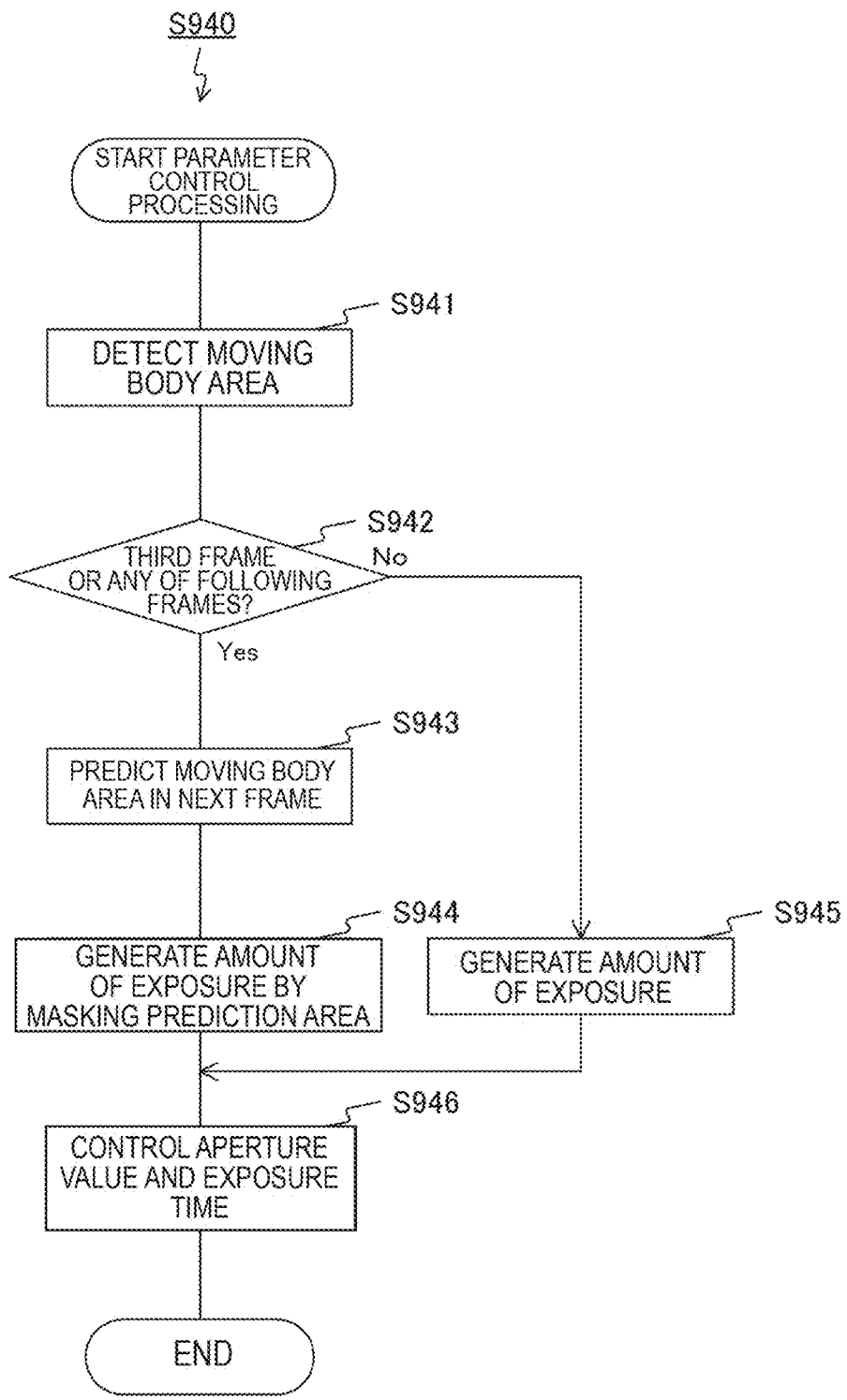
FIG. 17 is a flowchart illustrating an example of parameter control processing according to the second embodiment.

FIG. 17 is a flowchart illustrating an example of parameter control processing according to the second embodiment. The image capture apparatus 100 detects a moving body area (Step S941) and determines whether or not the input frame is a third frame or any of the following frames (Step S942). If the input frame is the third frame or any of the following frames (Step S942: Yes), an area corresponding to the moving body in the next frame is predicted as a prediction area (Step S943). Then, the image capture apparatus 100 generates control information including the amount of exposure by masking the prediction area in the processing area (Step S944).

In contrast, if the input frame is not the third frame or any of the following frames (Step S942: No), the image capture apparatus 100 generates the control information including the amount of exposure (Step S945).

After Step S944 or S945, the image capture apparatus 100 controls the aperture value and the exposure time based on the amount of exposure (Step S946) and completes the parameter control processing.

Figure 18:
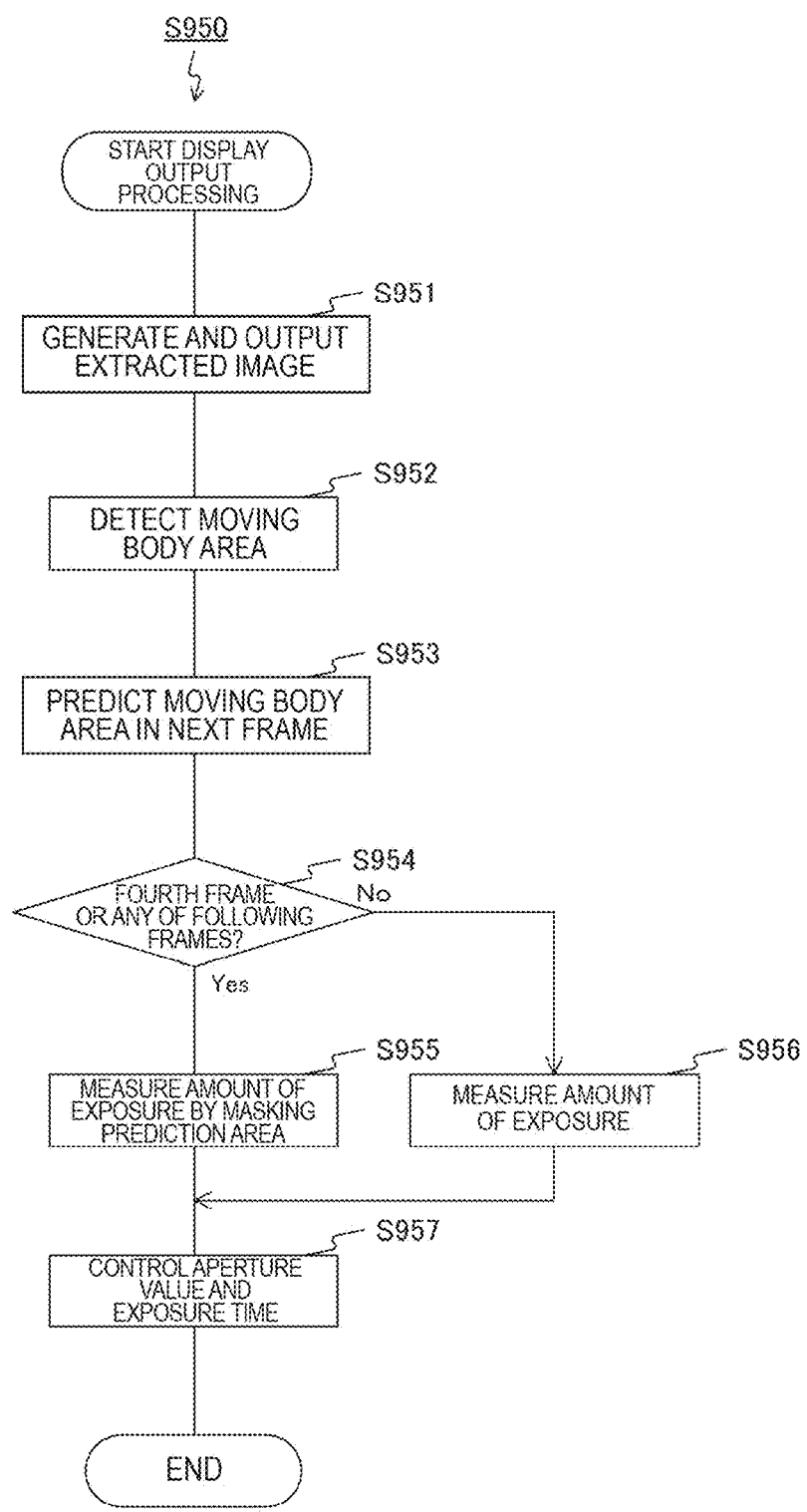
FIG. 18 is a flowchart illustrating an example of display output processing according to the second embodiment.

FIG. 18 is a flowchart illustrating an example of display output processing according to the second embodiment. The image capture apparatus 100 extracts an extraction area from a frame, generates an extracted image, and outputs the extracted image to the display apparatus 300 (Step S951). The image capture apparatus 100 detects a moving body area (Step S952) and predicts an area corresponding to a moving body in the next frame as a prediction area (Step S953). The image capture apparatus 100 determines whether or not the input frame is a fourth frame or any of the following frames (Step S954). If the input frame is the fourth frame or any of the following frames (Step S954: Yes), the image capture apparatus 100 generates control information including the amount of exposure by masking the prediction area in the processing area (Step S955).

In contrast, if the input frame is not the fourth frame or any of the following frames (Step S954: No), the image capture apparatus 100 generates the control information including the amount of exposure (Step S956).

After Step S955 or S956, the image capture apparatus 100 controls the aperture value and the exposure time based on the amount of exposure (Step S957) and completes the display output control processing. Although the image capture apparatus 100 generates the extracted image every time two input frames are captured, the extracted image may be generated every time three or more input frames are captured.

According to the second embodiment, the image capture apparatus 100 can maintain image quality of the extracted image even if the amount of exposure rapidly changes since the image capture apparatus 100 extracts the extracted image every time a plurality of input frames are captured as described above.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

In addition, the effects described in the present specification are not limiting but are merely examples, and there may be additional effects.

Additionally, the present technology may also be configured as below.

(1)

An image capture control apparatus including:

a moving body detection unit that detects, as a moving body area, an area of a moving body from an input frame every time the input frame captured by an image capture unit is input;

a prediction unit that predicts, as a prediction area, an area corresponding to the moving body area in a next input frame following the input frame from the moving body area every time the input frame is input;

a statistical information generation unit that generates statistical information by performing predetermined statistical processing on each of pixel values of pixels in either an area excluding the predicted prediction area from a specific processing area in the input frame or an area that overlaps the prediction area in the processing area every time the input frame is input;

a control information generation unit that generates predetermined control information for controlling the image capture unit based on the statistical information every time the statistical information is generated; and a controller that controls the image capture unit and causes the image capture unit to capture the next input frame based on the control information every time the control information is generated.

(2)

The image capture control apparatus according to (1), further including:

an image extraction unit that extracts an extraction area including at least a part of the processing area in the input frame.

(3)

The image capture control apparatus according to (2), wherein the image extraction unit extracts the extraction area every time the input frame is input a plurality of times.

(4)

The image capture control apparatus according to (2), wherein the extraction area includes the entire processing area.

(5)

The image capture control apparatus according to (2), wherein the processing area includes the entire extraction area.

(6)

An image capture apparatus including:

an image capture unit that images an input frame a plurality of times;

a prediction unit that predicts, as a prediction area, an area corresponding to the moving body area in a next input frame following the input frame from the moving body area every time the input frame is input;

a statistical information generation unit that generates statistical information by performing predetermined statistical processing on each of pixel values of pixels in either an image excluding the predicted prediction area from a specific processing area in the input frame or an area that overlaps the prediction area in the processing area every time the input frame is input;

a statistical information generation unit that generates statistical information by performing predetermined statistical processing on each of pixel values of pixels in an area excluding a prediction area predicted in an input frame before the input frame from the specific processing area in the input frame every time the input frame is input;

a control information generation unit that generates predetermined control information for controlling the image capture unit based on the statistical information every time the statistical information is generated; and a controller that controls the image capture unit and causes the image capture unit to capture the next input frame based on the control information every time the control information is generated.

(7)

The image capture apparatus according to (6), wherein the image capture unit performs exposure with light intensity adjusted in accordance with an aperture value during an exposure time, the control information includes an amount of exposure, and the controller controls at least one of the aperture value and the exposure time based on the amount of exposure.

(8)

The image capture apparatus according to (6) or (7), wherein the image capture unit includes a focus lens, the control information includes distance information regarding a distance to an object, and the controller controls a position of the focus lens based on the distance information.

(9)

The image capture apparatus according to any of (6) to (8), wherein the image capture unit includes an image sensor that generates a plurality of pieces of pixel data with mutually different colors, and a signal processing unit that amplifies the pixel data using a predetermined gain, the control information includes statistical amounts of pixel values of the pixel data for each color, and the controller controls the gain for each color based on the statistical amounts.

(10)

A method of controlling an image capture control apparatus, the method including:

a moving body detection procedure in which a moving body detection unit detects, as a moving body area, an area of a moving body from an input frame every time the input frame captured by an image capture unit is input;

a prediction procedure in which a prediction unit predicts, as a prediction area, an area corresponding to the moving body area in a next input frame following the input frame from the moving body area every time the input frame is input;

a statistical information generation procedure in which a statistical information generation unit generates statistical information by performing predetermined statistical processing on each of pixel values of pixels in either an area excluding the predicted prediction area from a specific processing area in the input frame or an area that overlaps the prediction area in the processing area every time the input frame is input;

a control information generation procedure in which a control information generation unit generates predetermined control information for controlling the image capture unit based on the statistical information every time the statistical information is generated; and a control procedure in which a controller controls the image capture unit and causes the image capture unit to capture the next input frame based on the control information every time the control information is generated.

REFERENCE SIGNS LIST 100 image capture apparatus
110 image capture unit
111 image capture lens
112 diaphragm blade
113 signal processing unit
120 image extraction unit
130 image quality adjustment unit
140 moving body detection unit
141 background storage unit
142 difference area detection unit
150 prediction unit
160 statistical information generation unit
170 control information generation unit
180 controller
200 image sensor
210 row scanning circuit
220 pixel array unit
230 pixel circuit
231 photodiode
232 transfer transistor
233 reset transistor
234 floating diffusion layer
235 amplification transistor
236 selection transistor
250 timing control circuit
260 AD conversion unit
270 column scanning circuit
300 display apparatus

The invention claimed is:

1. An image capture control apparatus comprising:
a computer including a processing device and a memory device storing instructions that, when executed by the processing device, are configured to implement:
a moving body detection unit that detects, as a moving body area, an area of a moving body from an input frame every time the input frame captured by an image capture unit is input;
a prediction unit that predicts, as a prediction area, an area corresponding to the moving body area in a next input frame following the input frame from the moving body area every time the input frame is input;
a statistical information generation unit that generates statistical information by performing predetermined statistical processing on each of pixel values of pixels in an area at least partially excluding the predicted prediction area from a specific processing area in the input frame every time the input frame is input;
a control information generation unit that generates predetermined control information for controlling the image capture unit based on the statistical information every time the statistical information is generated; and
a controller that controls the image capture unit and causes the image capture unit to capture the next input frame based on the control information every time the control information is generated.

2. The image capture control apparatus according to claim 1, wherein the instructions are further configured to implement:
an image extraction unit that extracts an extraction area including at least a part of the processing area in the input frame.

3. The image capture control apparatus according to claim 2, wherein the image extraction unit extracts the extraction area every time the input frame is input a plurality of times.

4. The image capture control apparatus according to claim 2, wherein the extraction area includes the entire processing area.

5. The image capture control apparatus according to claim 2, wherein the processing area includes the entire extraction area.

6. An image capture apparatus comprising:
an image capture unit that images an input frame a plurality of times; and
a computer including a processing device and a memory device storing instructions that, when executed by the processing device, are configured to implement:
a prediction unit that predicts, as a prediction area, an area corresponding to the moving body area in a next input frame following the input frame from the moving body area every time the input frame is input;
a statistical information generation unit that generates statistical information by performing predetermined statistical processing on each of pixel values of pixels in an image excluding the predicted prediction area from a specific processing area in the input frame every time the input frame is input;
a statistical information generation unit that generates statistical information by performing predetermined statistical processing on each of pixel values of pixels in an area at least partially excluding a prediction area predicted in an input frame before the input frame from the specific processing area in the input frame every time the input frame is input;
a control information generation unit that generates predetermined control information for controlling the image capture unit based on the statistical information every time the statistical information is generated; and
a controller that controls the image capture unit and causes the image capture unit to capture the next input frame based on the control information every time the control information is generated.

7. The image capture apparatus according to claim 6, wherein
the image capture unit performs exposure with light intensity adjusted in accordance with an aperture value during an exposure time,
the control information includes an amount of exposure, and
the controller controls at least one of the aperture value and the exposure time based on the amount of exposure.

8. The image capture apparatus according to claim 6, wherein
the image capture unit includes a focus lens,
the control information includes distance information regarding a distance to an object, and
the controller controls a position of the focus lens based on the distance information.

9. The image capture apparatus according to claim 6, wherein
the image capture unit includes
an image sensor that generates a plurality of pieces of pixel data with mutually different colors, and
a signal processing unit that amplifies the pixel data using a predetermined gain,
the control information includes statistical amounts of pixel values of the pixel data for each color, and
the controller controls the gain for each color based on the statistical amounts.

10. A method of controlling an image capture control apparatus performed by a computer including a processing device and a memory device storing instructions for performing the method, comprising:
detecting, as a moving body area, an area of a moving body from an input frame every time the input frame captured by an image capture unit is input;
predicting, as a prediction area, an area corresponding to the moving body area in a next input frame following the input frame from the moving body area every time the input frame is input;
generating statistical information by performing predetermined statistical processing on each of pixel values of pixels in an area at least partially excluding the predicted prediction area from a specific processing area in the input frame every time the input frame is input;
generating predetermined control information for controlling the image capture unit based on the statistical information every time the statistical information is generated; and
controlling the image capture unit and causing the image capture unit to capture the next input frame based on the control information every time the control information is generated.

* * * * *